United States Patent
Miskovic et al.

(10) Patent No.: US 10,783,169 B1
(45) Date of Patent: Sep. 22, 2020

(54) INFERRING USER INTERESTS FROM GEO-LOCATION REPORTS

(71) Applicant: The Boeing Company, Chicago, IL (US)

(72) Inventors: Stanislav Miskovic, San Jose, CA (US); Mario Baldi, Cuneo (IT); Ning Xia, Evanston, IL (US); Aleksandar Kuzmanovic, Evanston, IL (US)

(73) Assignee: The Boeing Company, Chicago, IL (US)

( * ) Notice: Subject to any disclaimer, the term of this patent is extended or adjusted under 35 U.S.C. 154(b) by 377 days.

(21) Appl. No.: 13/756,309

(22) Filed: Jan. 31, 2013

(51) Int. Cl.
*G06F 16/29* (2019.01)
(52) U.S. Cl.
CPC .................. *G06F 16/29* (2019.01)
(58) Field of Classification Search
USPC ........................................................ 707/748
See application file for complete search history.

(56) References Cited

U.S. PATENT DOCUMENTS

| | | | | |
|---|---|---|---|---|
| 7,071,842 B1* | 7/2006 | Brady, Jr. | ...................... | 340/988 |
| 2009/0055088 A1* | 2/2009 | Zhang | ..................... | G01C 21/20 701/533 |
| 2010/0153292 A1* | 6/2010 | Zheng et al. | ................. | 705/347 |
| 2011/0250903 A1* | 10/2011 | Huang | ................... | G01S 5/0263 455/456.1 |
| 2011/0313657 A1* | 12/2011 | Myllymaki et al. | .......... | 701/208 |
| 2012/0100867 A1* | 4/2012 | Liang et al. | ................ | 455/456.1 |
| 2013/0006515 A1* | 1/2013 | Vellaikal et al. | ............. | 701/410 |
| 2013/0103697 A1* | 4/2013 | Hill et al. | ...................... | 707/748 |
| 2013/0345958 A1* | 12/2013 | Paek et al. | ..................... | 701/400 |
| 2014/0214479 A1* | 7/2014 | Singel et al. | ................ | 705/7.29 |

OTHER PUBLICATIONS

Kim et al., "Semantic LBS: Ontological Approach for Enhancing Interoperability in Location Based Services", Springer-Verlag Berlin Heidelberg 2006.*
Bader et al., "Context-Aware POI Recommendations in an Automotive Scenario using Multi-Criteria Decision Making Methods", CaRR 2011, Feb. 13, 2011, Stanford, CA, USA.*
Noulas et al., "Mining User Mobility Features for Next Place Prediction in Location-based Services", 2012 IEEE 12th International Conference on Data Mining.*

* cited by examiner

*Primary Examiner* — Mohsen Almani
(74) *Attorney, Agent, or Firm* — Kwan & Olynick LLP (57) ABSTRACT

A method for inferring a user interest from geo data items associated with the user. The method includes retrieving point-of-interests (PoIs) from a PoI information repository based on the geo data items, generating a weighted count of the PoI for each geo data item that is weighted based on an attribute of the geo data item, and aggregating the weighted count across all geo data items to generate a score of the PoI, wherein the interest level of the user is inferred based at least on the score of the PoI.

29 Claims, 4 Drawing Sheets

INFERRING USER INTERESTS FROM GEO-LOCATION REPORTS

BACKGROUND OF THE INVENTION

Internet traffic offers a wealth of geo-location data that originates from a user input as well as location based services. For example, a user sends geo-coordinates to find a restaurant on Google© Maps, as well as a location-targeted advertisement (ad) sending geo-coordinates of a targeted region inside the ads' HTTP headers, etc. Among the steady influx of geo data items from diverse geo-location sources, some reports are related to point-of-interests (PoIs), while others may not correspond to interests, thus creating noise to interest extraction. Examples of such noises are geo data items originating from a user's casual swiping over Google© maps, driving on a highway, or sending weather alerts about random cities in a given state.

SUMMARY

In general, in one aspect, the present invention relates to a method for inferring an interest of a user from a plurality of geo data items associated with the user. The method includes retrieving a plurality of point-of-interests (PoIs) from a PoI information repository, wherein a PoI of the plurality of PoIs is retrieved based on at least one geo data item of the plurality of geo data items, wherein each of the plurality of geo data items identifies a geo-location based on at least one geo-coordinate, generating, by a computer processor and based on a pre-determined criterion, a weighted count of the PoI for each of the at least one geo data item, wherein each weighted count is weighted based on an attribute of a geo data item for which the weighted count is generated, and aggregating the weighted count across all of the at least one geo data item to generate a score of the PoI, wherein the interest level of the user is inferred based at least on the score of the PoI.

In general, in one aspect, the present invention relates to a system for inferring an interest of a user from a plurality of geo data items associated with the user. The system includes a PoI information repository storing a plurality of point-of-interests (PoIs), a computer processor and memory storing instructions, when executed by the computer processor comprising functionality to retrieve a plurality of PoIs from the PoI information repository, wherein a PoI of the plurality of PoIs is retrieved based on at least one geo data item of the plurality of geo data items, wherein each of the plurality of geo data items identifies a geo-location based on at least one geo-coordinate, generate, based on a pre-determined criterion, a weighted count of the PoI for each of the at least one geo data item, wherein each weighted count is weighted based on an attribute of a geo data item for which the weighted count is generated, and aggregate the weighted count across all of the at least one geo data item to generate a score of the PoI, wherein the interest level of the user is inferred based at least on the score of the PoI, and a repository storing the plurality of PoIs retrieved from the PoI information repository.

In general, in one aspect, the present invention relates to a non-transitory computer readable medium embodying instructions for inferring an interest of a user from a plurality of geo data items associated with the user. The instructions when executed by a processor comprising functionality for retrieving a plurality of point-of-interests (PoIs) from a PoI information repository, wherein a PoI of the plurality of PoIs is retrieved based on at least one geo data item of the plurality of geo data items, wherein each of the plurality of geo data items identifies a geo-location based on at least one geo-coordinate, generating, based on a pre-determined criterion, a weighted count of the PoI for each of the at least one geo data item, wherein each weighted count is weighted based on an attribute of a geo data item for which the weighted count is generated, and aggregating the weighted count across all of the at least one geo data item to generate a score of the PoI, wherein the interest level of the user is inferred based at least on the score of the PoI.

Other aspects and advantages of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

Throughout this disclosure, the term "flow" refers to a sequence of packets exchanged between two network nodes, referred to as a source and a destination of the flow where the source or the destination may be the originator of the exchange. Generally, in an IP network, such as the Internet, a flow is identified by a 5-tuple of <source IP address, destination IP address, source port, destination port, protocol> where the payload of the flow may be represented by a string of alphanumeric characters and other sequences of bits.

Generally, the term "flow" may refer to a unidirectional flow or a bi-directional flow. A unidirectional flow includes only data packets traveling in one direction, either from server node to client node or vice versa. A bi-directional flow includes data packets traveling in both directions from server node to client node, and vice versa. The originator of the flow may be the server node or the client node. A bi-directional flow includes a combination of two unidirectional flows traveling in opposite directions. In one or more embodiments, a bi-directional flow is analyzed by analyzing two unidirectional flows separately. Analyzing the network traffic based on unidirectional flows provides a solution to the routing asymmetry at the Internet backbone, where one direction of a flow is often missing. Using unidirectional flows allows the user interest inference tool to be deployed anywhere in the network.

In one or more embodiments, the term "geo-coordinates" refers to a pair of numerical values indicating latitude and longitude of a physical location or area. In addition, the terms "geo report," "geo location report," "geo-coordinate report," and "geo data item" may be used interchangeably and refer to an instance of geo-coordinates found in Internet traffic. Further, the term "geo-location data" refers to data containing one or more geo reports. In other words, geo-location data comprises one or more geo data item, while a geo data item identifies a geo-location based on at least one geo-coordinate.

A point of interest, or PoI, is a specific point location that someone may find useful or interesting. While a PoI may refer to any location that offers specific activity (e.g., sailing) or business type (e.g., a beach restaurant or marina). Most consumers use the term when referring to hotels, campsites, fuel stations or any other categories used in modern (automotive) navigation systems. In one or more embodiments, a PoI specifies, at minimum, the latitude and longitude of the location based on a certain map datum. A name or description is usually attached to a PoI.

Embodiments of the invention provide a method, system, and computer readable medium to identify interests of individual users based on observations of the users' geo-coordinate reports as well as associations of such reports to potential points of interest (PoI). In one or more embodiments, identifying the user interest is based on passive observations of Internet traffic (usually containing the traffic originating from numerous users). Generally, association (i.e., having a geo-coordinate report pointing to nearby location near the PoI) of a user to a PoI may indicate evidence that the user physically visited the PoI or identifying that the user inquired about the PoI (e.g., the user's web search resulting in a geo-coordinate report that may relate to the PoI). In one or more embodiments, as noted above, the term "PoI" refers to any location that offers specific activity (e.g., sailing) or business type (e.g., a beach restaurant or marina). In one or more embodiments, the term "user interest" or "interest of a user" refers to any attribute common to a set of the user's PoIs. For example, identifying that a user visited several Starbucks© stores and a Peet's© Coffee store may generate several potential user interests such as "beverages", "coffee", "coffee house", "Starbucks", "Peet's Coffee", etc.

Generally, observations of geo-coordinate reports alone are not sufficient to infer user interests due to a number of uncertain factors: (i) user interests may not be identified due to coarse-grained or missing reports of geo-coordinates; (ii) the reports may originate from services that are not related to any interest; (iii) the reports may be related to services that target interests of general population instead of the observed user; (iv) it is generally challenging to distinguish between the reports referring to the user's current location and other remote locations that may be of interest to the user. These uncertainties related to geo reports in Internet traffic result in noisy geo-location data. In one or more embodiments, accuracy of the reported geo data, temporal patterns indicating recurrence of reported locations, report grouping and collocation with reports of other users, and semantics associated with the reports (e.g., which service generated the geo-report) are analyzed to infer user interest from noisy geo-location data.

Figure 1A:
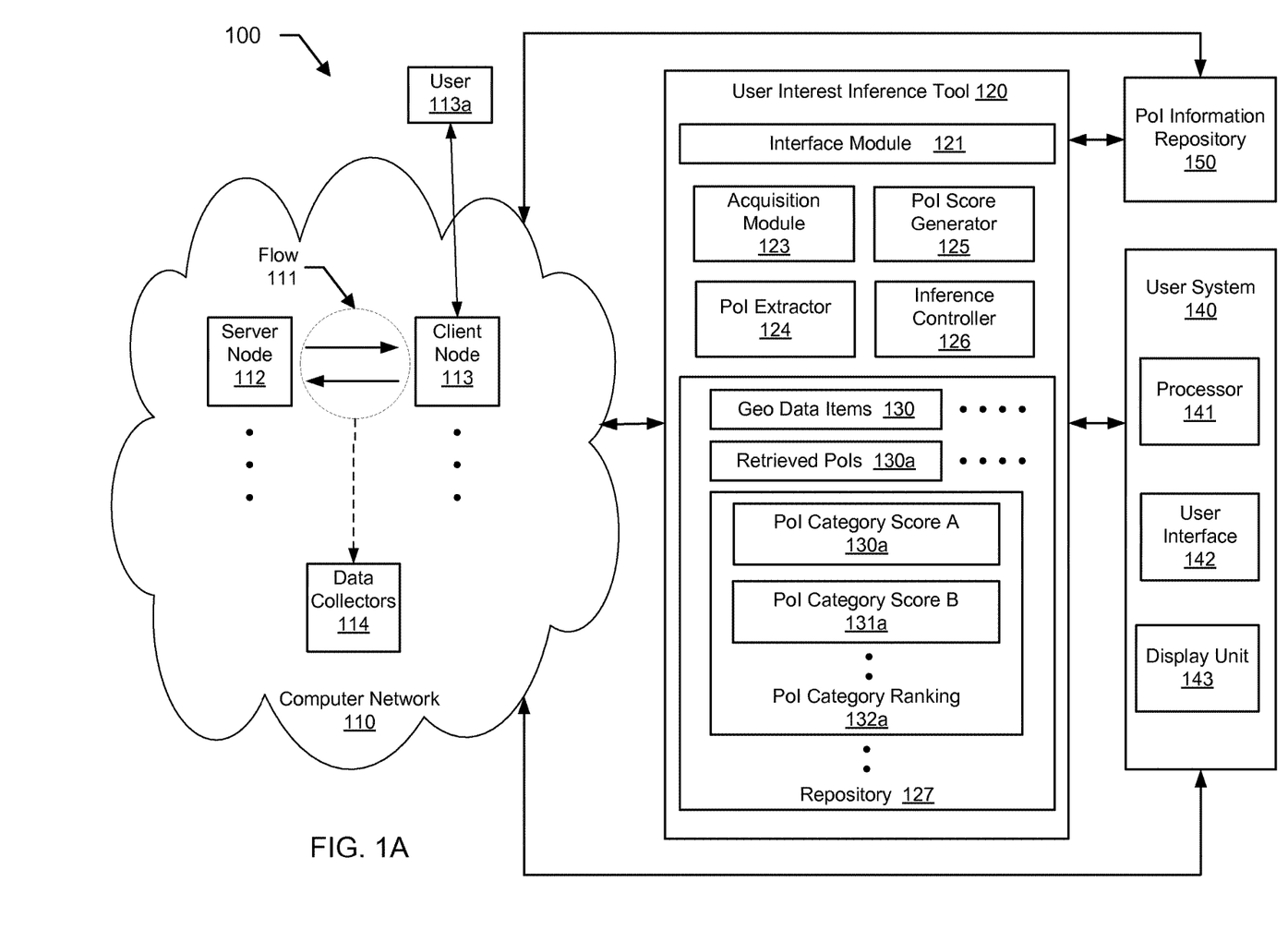
FIGS. 1A-1B show a system block diagram according to aspects of the invention.

FIG. 1A shows a diagram of a system (100) for inferring user interest from geo data items in accordance with one or more embodiments. In one or more embodiments of the invention, one or more of the components shown in FIG. 1A may be omitted, repeated, and/or partitioned in a different manner. Accordingly, embodiments of the invention should not be considered limited to the specific arrangements of components shown in FIG. 1A.

As shown in FIG. 1A, the system (100) includes a user interest inference tool (120), a PoI information repository, a user system (140), and a computer network (110). The user interest inference tool (120) includes data repository (127), one or more application interfaces (121), an acquisition module (123), a PoI extractor (124), a PoI score generator (125), and an inference controller (126). The user system (140) includes a processor (141), a user interface (142), and a display unit (143). The computer network (110) may include cellular communications network or other mobile communications network, wired and/or wireless portions of the Internet, wide area networks (WANs), local area networks (LANs), etc.

Further, the computer network (110) includes network nodes (e.g., server node (112), client node (113), data collectors (114), etc.), which are the devices configured with computing and communication capabilities for executing applications in the network (110). As shown in FIG. 1A, the server node (112) and client node (113) communicate with each other by exchanging data packets forming a flow (111), which includes two unidirectional flows represented by two arrows. Although shown as a bi-directional flow in the example depicted in FIG. 1A, the flow (111) may also be a single unidirectional flow in other examples. In one or more embodiments, the server node (112) and the client node (113) exchange data packets in the flow (111) as a result of an application executing on the server node (112) and the client node (113). In this context, the flow (111) is referred to as being generated by the application executing on the server node (112) and client node (113). In one or more embodiments, the client node (113) may be a mobile device, such as a smartphone, a tablet computer, a hand held gaming device, etc., used by a user (113a) (e.g., an individual). In such embodiments, the application may be referred to as a mobile application, mobile app, or app. For example, the application may include a location aware application, or may be used by the user (113a) to access a location aware service. In such example, the flow (111) may include one or more geo data item identifying a location, such as a physical location where the user (113a) is or has been, or a remote location of interest to the user (113a). In one or more embodiments, certain device(s) (e.g., data collectors (114)) within the computer network (110) may be configured to collect network data (e.g., flow (111)) for providing to the user interest inference tool (120). Each of these components is described below. One of ordinary skill in the art will appreciate that embodiments are not limited to the configuration shown in FIG. 1A.

In one or more embodiments of the invention, the user interest inference tool (120) is configured to interact with the computer network (110) using one or more of the application interface(s) (121). The interface module (121) may be configured to receive data (e.g., flow (111)) from the computer network (110) and/or store received data to the data repository (127). Such network data captured over a time period (e.g., an hour, a day, a week, etc.) is referred to as a trace or network trace. Network trace contains network traffic data related to communications between nodes in the computer network (110). For example, the network trace may be captured on a routine basis using the data collectors (114) and selectively sent to the interface module (121) to be formatted and stored in the repository (127) for analysis. For example, the data collectors (114) may be a packet analyzer, network analyzer, protocol analyzer, sniffer, netflow device, semantic traffic analyzer (STA), or other types of data collection devices that intercept and log data traffic passing over the computer network (110) or a portion thereof. In one or more embodiments, the data collectors (114) may be deployed in the computer network (110) by a network communication service provider (e.g., ISP), a network security service provider, a cellular service provider (CSP) or other business or government entities. The data collector (114) may be configured to capture and provide network trace to the interface module (121) through an automated process, such as through a direct feed or some other form of automated process. Such network data may be captured and provided on a periodic basis (e.g., hourly, daily, weekly, etc.) or based on a trigger. For example, the trigger may be activated automatically in response to an event in the computer network (110) or activated manually through the user system (140). In one or more embodiments, the data collectors (114) are configured and/or activated by the user interest inference tool (120).

In one or more embodiments, the PoI information repository (150) is a third party source of PoI information, such as Foursquare©, Google© Maps API, Bing©, etc. For example, Foursquare© is a location-based social networking website for mobile devices, such as smartphones. In one or more embodiments, the PoI information repository (150) is included in the user interest inference tool (120), for example as part of the repository (127). In such embodiments, the PoI information stored in the PoI information repository (150) is previously collected by an operator of the user interest inference tool (120) and/or updated on an ongoing basis.

In one or more embodiments, the user system (140) is configured to interact with a user using the user interface (142). The user interface (142) may be configured to receive data and/or instruction(s) from the user. The user interface (142) may also be configured to deliver information (e.g., a report or an alert) to the user. In addition, the user interface (142) may be configured to send data and/or instruction(s) to, and receive data and/or information from, the user interest inference tool (120). The user may include, but is not limited to, an individual, a group, an organization, or some other entity having authority and/or responsibility to access the user interest inference tool (120). Specifically, the context of the term "user" (e.g., referred to as an analyst user) here is distinct from that of a user (e.g., user (113a)) of the computer network (110) or a user (e.g., user (113a)) of the application executing on the sever node (112) and the client node (113). The user system (140) may be, or may contain a form of, an internet-based communication device that is capable of communicating with the interface module (121) of the user interest inference tool (120). Alternatively, the user interest inference tool (120) may be part of the user system (140). The user system (140) may correspond to, but is not limited to, a workstation, a desktop computer, a laptop computer, or other user computing device.

In one or more embodiments, the processor (i.e., central processing unit (CPU)) (141) of the user system (140) is configured to execute instructions to operate the components of the user system (140) (e.g., the user interface (142) and the display unit (143)).

In one or more embodiments, the user system (140) may include a display unit (143). The display unit (143) may be a two dimensional (2D) or a three dimensional (3D) display configured to display information regarding the computer network (e.g., browsing the network traffic data) or to display intermediate and/or final results of the user interest inference tool (120) (e.g., report, alert, etc.), including intermediate and/or final results of the signature set selection process.

As shown, communication links are provided between the user interest inference tool (120), the computer network (110), the PoI information repository (150), and the user system (140). A variety of links may be provided to facilitate the flow of data through the system (100). For example, the communication links may provide for continuous, intermittent, one-way, two-way, and/or selective communication throughout the system (100). The communication links may be of any type, including but not limited to wired, wireless, and a sequence of links separated by intermediate systems routing data units. In one or more embodiments, the user interest inference tool (120), the user system (140), the PoI information repository (150), and the communication links may be part of the computer network (110).

In one or more embodiments, a central processing unit (CPU, not shown) of the user interest inference tool (120) is configured (e.g., programmed) to execute instructions to operate the components of the user interest inference tool (120). In one or more embodiments, the memory (not shown) of the user interest inference tool (120) is configured to store software instructions for analyzing the network trace to infer user interest. The memory may be one of a variety of memory devices, including but not limited to random access memory (RAM), read-only memory (ROM), cache memory, and flash memory. The memory may be further configured to serve as back-up storage for information stored in the data repository (127).

The user interest inference tool (120) may include one or more system computers, which may be implemented as a server or any conventional computing system having a hardware processor. However, those skilled in the art will appreciate that implementations of various technologies described herein may be practiced in other computer system configurations known to those skilled in the art.

In one or more embodiments, the user interest inference tool (120) is configured to obtain and store data in the data repository (127). In one or more embodiments, the data repository (127) is a persistent storage device (or set of devices) and is configured to receive data from the computer network (110) using the interface module (121). The data repository (127) is also configured to deliver working data to, and receive working data from, the acquisition module (123), PoI extractor (124), PoI score generator (125), and inference controller (126). The data repository (127) may be a data store (e.g., a database, a file system, one or more data structures configured in a memory, some other medium for storing data, or any suitable combination thereof), which may include information (e.g., geo data items (130), PoI category ranking (132a), etc.) related to inferring user interest. The data repository (127) may be a device internal to the user interest inference tool (120). Alternatively, the data repository (127) may be an external storage device operatively connected to the user interest inference tool (120).

In one or more embodiments, the user interest inference tool (120) is configured to interact with the user system (140) using the interface module (121). The interface module (121) may be configured to receive data and/or instruction(s) from the user system (140). The interface module (121) may also be configured to deliver information and/or instruction(s) to the user system (140). In one or more embodiments, the user interest inference tool (120) is configured to support various data formats provided by the user system (140).

In one or more embodiments, the user interest inference tool (120) includes the acquisition module (123) that is configured to obtain a network trace from the computer network (110), for example via data collectors (114). In one or more embodiments, the acquisition module (123) works in conjunction with the data collectors (114) to parse data packets and collate data packets belonging to the same flow tuple (i.e., the aforementioned 5-tuple) for flow reconstruction and for accumulating multiple flows (e.g., flow (111)) to form the network trace. Although not explicitly shown FIG. 1A, such network trace may be stored in the repository (127). As note above, when the user (113a) uses a location aware application or using an application to access a location aware service, the network trace may include one or more geo data items associated with the user (113a).

In one or more embodiments, a flow parser (e.g., acquisition module (123) in conjunction with data collectors (114)) reconstructs (e.g., eliminates redundant packets, collates packets into a correct sequence, etc.) all the packets that correspond to the same traffic flow identified by the aforementioned 5-tuple. In one or more embodiments, the flows are captured and parsed throughout a pre-configured time interval recurring on a periodic basis (e.g., every minute, hourly, daily, etc.) or triggered in response to an event.

In one or more embodiments of the invention, the user interest inference tool (120) includes the PoI extractor (124) that is configured to extract one or more geo data items associated with the user (113a) from one or more flows (e.g., flow (111)) in the network trace. As noted above, the user (113a) may be a mobile user using a smartphone, such as the client node (113) executing a location aware application or used to access a location aware service. For example, the flow (111) may include one or more geo data items associated with a physical location where the user (113a) is or has been, or a remote location of interest for the user (113a). Extracted geo data items associated with the user (113a) are then stored in the repository (127) as the geo data items (130). An example of the geo data items (130) that includes two geo data items (e.g., geo data item A (160a) and geo data item B (160b)) is illustrated in an example geographic map depicted in FIG. 1B below.

Figure 1B:
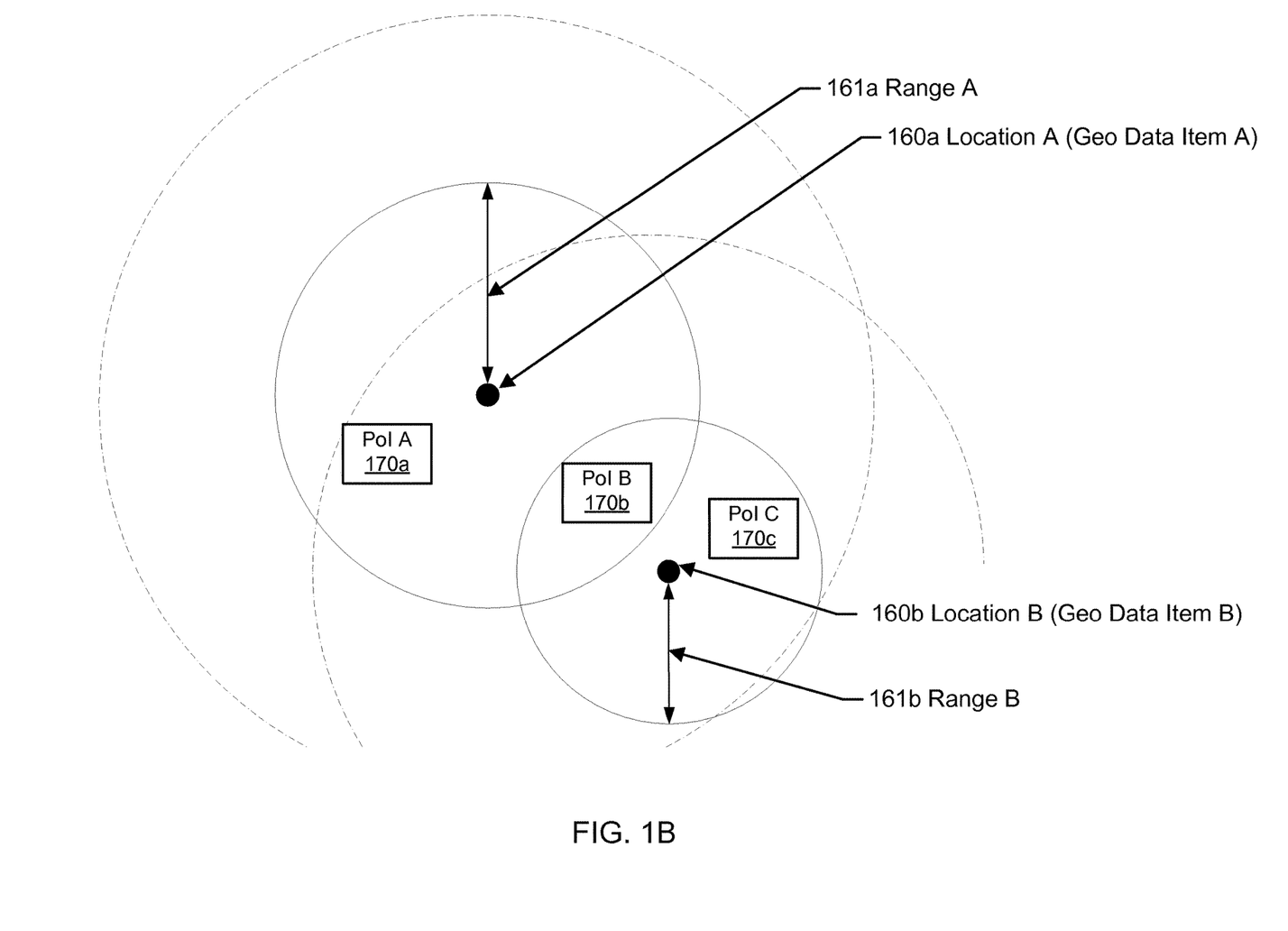

FIG. 1B shows an example geographic map having a location A (160a) and a location B (160b) that are identified by the geo data item A (160a) and the geo data item B (160b), respectively. In one or more embodiments, the geo data item A (160a) and geo data item B (160b) are associated with a range A (161a) and a range B (161b), respectively. In the example shown in FIG. 1B, the PoI information repository (150) includes the PoI A (170a), PoI B (170b), PoI C (170c), among others. In particular, the PoI A (170a) is within the range A (161a) from the location A (160a), PoI B (170b) is within the range A (161a) from the location A (160a) as well as within the range B (161b) from the location B (160b), and PoI C (170c) is within the range B (161b) from the location B (160b). In one or more embodiments, the range A (161a) is determined based on a precision measure of the geo data item A (160a). Similarly, the range B (161b) is determined based on the precision measure of the geo data item B (160b). In one or more embodiments, the precision measure is based on a digitization truncation error range of representing real world longitude and/or latitude using geocoordinates having fixed number of digits. For example, the geo-coordinate "45.718672" has a digitization truncation error range of 0.000001.

Returning to the discussion of FIG. 1A, the PoI extractor (124) is further configured to retrieve PoIs associated with the user (113a) from the PoI information repository (150) based on the geo data items (130). In one or more embodiments, any PoI within a range associated with a geo data item of the geo data items (130) is retrieved from the PoI information repository (150). Retrieved PoIs are then stored in the repository (127) as the retrieved PoIs (130a) associated with the user (113a). For example as shown in FIG. 1B, the PoI A (170a) and PoI B (170b) are retrieved from the PoI information repository (150) based on the geo data item A (160a). Similarly, the PoI B (170b) and PoI C (170c) are retrieved from the PoI information repository (150) based on the geo data item B (160b). Accordingly, in this example, the retrieved PoIs (130a) includes the PoI A (170a), PoI B (170b), and PoI C (170c). In one or more embodiments, the PoI extractor (124) is further configured to include a PoI in the retrieved PoIs (130a) or discard a PoI from being included in the retrieved PoIs (130a) based on a persistency measure of the geo data item, a semantic analysis result of the network traffic flow containing the geo data item, and/or a proximity measure of the geo data item with respect to a previously identified geo data item.

In one or more embodiments of the invention, the user interest inference tool (120) includes the PoI score generator (125) that is configured to generate, based on a pre-determined criterion, a weighted count of a retrieved PoI for each geo data item (e.g., one of the geo data items (130)) associated with the PoI. In one or more embodiments, each weighted count is weighted based on an attribute of the geo data item associated with the PoI. In one or more embodiments, the attribute may include one or more of precision, accuracy, range, context, proximity to other PoIs, a timestamp, etc. of the geo data item. In one or more embodiments, the PoI score generator (125) is further configured to aggregate the weighted count across all such geo data items (e.g., each geo data item of the geo data items (130)) to generate a score of the PoI associated with the user (113a). In particular, the score of the PoI represents a potential level of interest of the user (113a) in an aspect of the PoI. In one or more embodiments, multiple scores of multiple PoIs form a score vector of the user (113a). Further, the PoIs may be arranged in a sequence of increasing (or decreasing) scores to form a PoI ranking.

In one or more embodiments, the range associated with a geo data item is used as the attribute to determine the weighting of the PoI count for the geo data item. For example, the weighting may be inversely proportional to the range. As shown in FIG. 1B, assuming the range A (161a) is twice the range B (161b), each of the weighted counts of PoI A (170a) and PoI B (170b) for the geo data item A is 0.5, while each of the weighted counts of PoI B (170b) and PoI C (170c) for the geo data item B is 1. Accordingly, by aggregating the weighted count across the geo data item A (160a) and the geo data item B (160b), a score vector of [0.5, 1.5, 1.0] is generated that represents potential levels of interest (in vector form) of the user (113a) for PoI A (170a), PoI B (170b), PoI C (170c). Specifically, the user's relative interest levels for PoI A (170a), PoI B (170b), PoI C (170c) are 0.5, 1.5, and 1.0, respectively. Further, the PoI ranking of the retrieved PoIs (130a) is <PoI A (170a), PoI C (170c), PoI B (170b)> based on the scores of 0.5, 1.0, and 1.5, respectively.

In one or more embodiments of the invention, the user interest inference tool (120) includes the inference controller (126) that is configured to adjust various parameters, settings, thresholds, etc. of the PoI extractor (124) and/or the PoI score generator (125) such that the score of one or more PoI can be statistically differentiated among all of retrieved PoIs (130a) associated with the user (113a). Accordingly, the interest of the user (113a) is inferred based on differentiated scores of the retrieved PoIs (130a) associated with the user (113a).

In one or more embodiments, the ranges of the geo data item may be expanded or contracted by the inference controller (126) to increase a score differentiation measure of the score vector to meet certain pre-determined criterion. For example as shown in FIG. 1B, if each of the rang A (161a) and range B (161b) is expanded by a factor of 2 (shown as enclosed by the dashed circles) to include all three PoIs, each of the weighted counts of PoI A (170a), PoI B (170b), and PoI C (170c) for the geo data item A is 0.5, while each of the weighted counts of PoI A (170a), PoI B (170b), and PoI C (170c) for the geo data item B is 1. Accordingly, by aggregating the weighted count across the geo data item A (160a) and the geo data item B (160b), a score vector of [1.5, 1.5, 1.5] is generated. Comparing to the score vector without expanding the ranges, the new score vector [1.5, 1.5, 1.5] has a lower score differentiation measure since all PoIs have the same score. In one or more embodiments, the score differentiation measure is based on a ratio between the highest score and the second highest score in the vector. In other embodiments, other statistical measure may also be used to represent a level of differentiation among all scores in the score vector.

In one or more embodiments, dependency of score weighting on the range is configured by the inference controller (126) to increase a score differentiation measure of the score vector to meet certain pre-determined criterion. For example, the dependency may be linear, quadratic, exponential, etc., as configured by the inference controller (126).

In one or more embodiments, a PoI in the PoI information repository (150) is associated with a hierarchy of categories where each level in the hierarchy has a different granularity. In such embodiments, the hierarchy level of the retrieved PoI may be configured by the inference controller (126) to increase a score differentiation measure of the score vector to meet certain pre-determined criterion. For example, for a coffee shop location identified by a geo data item, the PoI retrieved from the PoI information repository (150) may be "Starbucks© at 1200 Stevens Creek Blvd, Cupertino," "Starbucks©," "artisan café," "coffee shop," "beverage store," etc. In the context when the hierarchy level of the PoI category is configured, the score of the PoI A (170a) is referred to as PoI category score A (130a), the score of the PoI B (170a) is referred to as PoI category score B (130b), and the PoI ranking of the retrieved PoIs (130a) is referred to as the PoI category ranking (132a). Similarly, a score vector is referred to as a category score vector. For example, the category score vector at a lower category hierarchy level may be [1, 1, 1] for Starbucks©, Peet's©, and Marios' grocery store with practically no score differentiation. However, when the inference controller (126) adjusts the category hierarchy level, the category score vector becomes [2,1] for coffee house (e.g., Starbucks©, Peet's©) and grocery store (i.e., Marios' grocery store), which has a higher category score differentiation measure. In one or more embodiments, the category score differentiation measure is based on a ratio between the highest category score and the second highest category score in the category score vector. In other embodiments, other statistical measure may also be used to represent a level of differentiation among all category scores in the category score vector.

In one or more embodiments, the geo data item is associated with a time stamp. In such embodiments, each PoI in the retrieved PoIs (130a) may be filtered by requiring the time stamp of the corresponding geo data item (based on which the PoI is retrieved) to match a recurring time interval. In such embodiments, the recurring time interval for retrieving the PoI may be configured by the inference controller (126) to increase a score differentiation measure of the score vector to meet certain pre-determined criterion. For example, the PoI may be retrieved from the PoI information repository (150) only an associated geo data item has a time stamp matching "10-11 am every Monday morning," "every morning," "every Monday," "every other Tuesday," "last day of each month," etc. as configured by the inference controller (126).

In one or more embodiments, multiple users exist and an additional set of geo data items, separate from the geo data items (130), is extracted from the network trace for each additional user. Accordingly, additional set of retrieved PoIs, separate from the retrieved PoIs (130a), is retrieved from the PoI information repository (150) for each additional user. Further, additional PoI category ranking, separate from the PoI category ranking (132a) is generated for each additional user.

Additional rules, or configuring parameters thereof, for retrieving PoIs, and generating PoI score or PoI category score by the user interest inference tool (120) are described in reference to FIG. 2 below. While specific components are depicted and/or described for use in the units and/or modules of the user interest inference tool (120), it will be appreciated that a variety of components with various functions may be used to provide the formatting, processing, utility and coordination functions necessary to modify various working data used by the user interest inference tool (120). The components may have combined functionalities and may be implemented as software, hardware, firmware, or combinations thereof.

Figure 2:
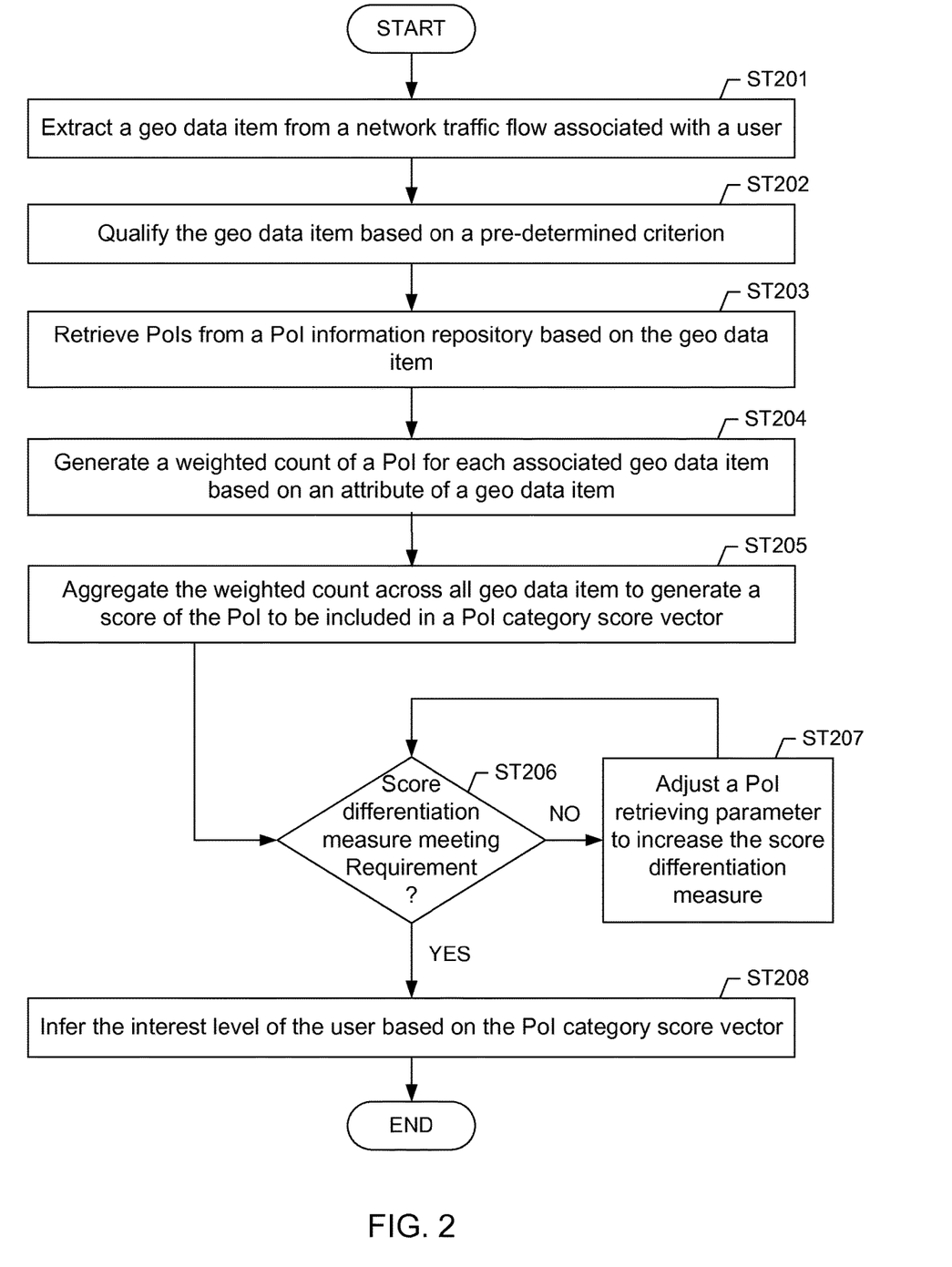
FIG. 2 shows a flowchart of a method according to aspects of the invention.

FIG. 2 depicts a flowchart of method in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2. In one or more embodiments of the invention, the methods depicted in FIG. 2 may be practiced using system (100) described with respect to FIGS. 1A and 1B above.

Initially in Step 201, a geo data item is extracted from a network traffic flow associated with a user. For example a shown in FIG. 1A, the user may be the user (113a) using a smartphone (e.g., client node (113)), the network traffic flow may be the flow (111), and the geo data item may be extracted as one of the geo data items (130). In one or more embodiments, the extraction is based on observation and traffic parsing of geo data items in Internet traffic. For example, such parsing may be performed by creating regular expressions that point to traffic markers which indicate geo-locations, and to exact the corresponding geo-location coordinates. For example, one such traffic marker is "dloc=" pointing to a geo data item (41.2006406, −93.8460647) in the following Internet traffic excerpt:

rtb.nexage.com/exchange/rtb/ad/
8a8094?dcountry=USA&dmake=Motorola &do
s=Android&dloc=41.2006406% 2C-93.8460647
&ukeywords=gaming The corresponding regular expression that identifies such geo data item and extracts corresponding geo coordinates is: "dloc=([0−9.]+)%2C([0−9.−]+)".

In Step 202, the geo data item is qualified based on one or more criteria. In one or more embodiments, the geo data item is retained in a set of validated geo data items based on one or more of a persistency measure of the geo data item, a semantic analysis result of the network traffic flow containing the geo data item, and a proximity measure of the geo data item with respect to a previously identified geo data item. For example, the geo data items may be classified into three classes:

(A) Reports indicating actual locations/areas visited by the observed users, (B) Reports indicating users' interests in remote PoIs, (C) Geo-location noise.

Moreover, the geo data items in both of the first two classes (A) and (B) may have different importance/weight in representing user interests. For example, a user explicitly requesting for weather forecast has a general interest for the extended area around that location, while a user requesting directions to a specific location has a specific interest in that location (e.g., to practice a sport or to shop at a store at that location).

In one or more embodiments, geo data items that identify actual user visitations are classified based on anchoring tokens. An anchoring token is a qualifying condition that persistently indicates actual user locations/areas at times of inserting geo data items into the traffic flow. Having identified such tokens, it can be determined that geo data items pointing to a predefined vicinity (local and temporal) of the tokens' indications are actually pointing to the user's physical locations. For example, a frequent observation that a user was within a 500-meter range of a geo location (37.3681, −122.0372) at 4:00 pm as well as at 4:15 pm. Accordingly, this observed condition is used as the anchoring token and added to the anchoring token set. Subsequently, any geo data item pointing to that area and being within that time interval is determined to be indicative of the user's actual physical location.

In one or more embodiments, anchoring tokens are based on available/observable resources. For an example related to cellular service providers, the anchoring token may be an estimated coverage area of the user's base station. In another example related to Internet service providers, enterprise network owners, or HotSpot owners, the anchoring token may be a neighborhood of the observed user's access point, DSL line, Internet PoP, etc. In yet another example, the anchoring token may be a geographical area associated with the user's source IP address.

Moreover, anchoring tokens may be related to non-geographical entities. In one or more embodiments, a token is a specific Internet service or a traffic tag that is persistently (or predominantly) accompanied by geo data item identifying actual user locations. Examples of such tokens include mobile navigation services, specific values of HTTP fields, fragments of HTTP URI, key-value pairs embedded in data payload, etc. For example, the geo-coordinates (41.9911, 97,2367) reported by the "anchoring" Garmin navigation service:

http://connect.garmin.com/activity/
214215672?sk=Age0_0ryNsM6crCI7cG dXvLZXJ7Vs-
AqcoLSWLLOoAnXPz5Y3CEX-WYtECa-
yl4L&pid=5902&DATA=[{%22lod %22%3A
%2234%22%2C %22mo %22%3A % 220.01%22%2C
%22mc %22%3A %22%5B41.99%2C-97.2367%5D
%22%2C %22til %22%3A24%2C %22TS
%22%3A1345776430435}

Another example being an "anchoring" homepage HTTP header field:

homepage: 42.72728391124494,-88.05365582617189, 10;

Yet another example being an "anchoring" 'sll=' key in Google search on mobile devices:

www.google.com/m/gne/suggest/
v2?q=&hl=en&app=iss&appv=13324796 3
&platform=android&gl=US &sll=45.718672,-
121.514698&acc=457&feeds=qs,list,ns Next, to identify "seeds" of such non-geographical anchoring tokens, an analyst user may construct a controlled identification environment. In one or more embodiments, one or more mobile devices (or smartphones) are instrumented to log Internet traffic during their usages. In a test period, a user of such device would be mobile and use various popular apps that are likely to report geo coordinates (such as navigation apps, social networking apps, Internet search, etc.). At the end of the testing period, the locations found in the collected traffic are compared to the actual user's mobile trajectory. Then, the sources of location reports that persistently match the user's actual movements are chosen as anchoring tokens.

In contrast to PoIs related to actual user locations, a multitude of remote PoIs can be identified by observing users' network activity, such as accessing web services, using mobile apps that communicate with Internet servers or other applications sending geo-location data through the network to/from specific servers. For example, a user may be travelling and searching ahead for the best-rated restaurants at his destination, or for the directions to destination, or the weather forecast at the destination. Syntax of user's network activity may be used to identify remote PoIs, as well as to aggregate results around them. As a special case, user's queries might be leveraged.

To identify remote PoIs, the Internet traffic that contains user requests and corresponding responses are observed. The semantic of such traffic may follow an expression of user interest: user transmits geo-location coordinates as a part of his request for content at the coordinates' location and receives at least a related response to the query; or the user receives geo-location coordinates in a response to the query. On the other hand, geo-coordinate reports existing in some types of traffic (e.g., geo-coordinates corresponding to an area for which a weather app is sending a weather report) may be ignored until it becomes apparent that the geo data items are relevant, i.e., that the geo data items either refer to the user location or to a location that is of interest to the user. This criterion is met after analyzing other types of information, such as other geo data items, PoIs relevant to the user, information associated with the user in his profile, interests, attributes, and demographics gathered about the user.

In one or more embodiments, to ensure that the observed request-response traffic contains relevant geo information, only certain request-response traffic are used fro analysis, for example those traffic where response messages contain one or more geo data items, while the request may or may not contain geo data items.

To eliminate geo location noises, such as a user may be casually swiping over a Google© Map without being interested in anything specific, persistence of geo data items is evaluated as related to a specific area. A number of metrics may be used to determine the persistence. In one of the embodiments, the rate of requests may be applied, such that the number of requests for a given area and a predetermined time interval is required to be greater than some threshold and/or lower than another threshold (in order to ensure that a user can read all response data). The setting of thresholds may be established according to the volume of reported geo-coordinates or according to the specific network activity. For example, querying for a restaurant at a specific location and receiving a response with geo-coordinates of 5 existing restaurants is an expression of user's interests, while repeatedly clicking and quickly hovering over a Google© Map is not. Another persistence measure could be the rate overlaps in geo-location responses. For example, a user shopping for a hotel accommodation would observe overlaps in geo data items corresponding to similar hotels offered by multiple web sites, thus confirming his interest for a hotel in a given area.

Finally, once the initial geo data items of relevant remote PoIs are identified, any traffic that points to the neighboring locations of such reports may be considered as a source of other relevant PoIs. For example, having identified that a user is interested in a hotel on Bahamas at a given time, any user's searches at that time pointing to locations around the hotel would also be considered for relevant PoIs.

In summary, identification of relevant remote location information (to differentiate from noise) included in traffic related to network activity may be based on at least geo data item persistency, semantics of the network activity based on which the geo data item is extracted, and vicinity to a location previously identified as relevant. Based on the foregoing, geo data item that are not classified as indicators of actual user locations or remote relevant locations are considered as a geo-location noise.

In one or more embodiments, geo data items that identify actual user visitations are classified based on temporal pruning to remove geo-location noise. The pruning requires that a user exhibits some stationary properties at the reported location, which would help indicate that the user is actually interested in them. For example, to be considered for analysis, a geo data item has to be sent from a given location at least 3 times in a 15 minute interval. This rule discards PoIs that were never actually visited, such as most gas stations or restaurants near a highway on which the user is driving.

In one or more embodiments, geo-location noise classification criteria are adaptive, such that geo data items initially classified as noise may be re-classified as useful geo information later on. Such re-classification may occur after a discovery of initial anchoring tokens and/or "seeds" pointing to remote PoIs. Consequently, geo-location noise are not be discarded, but rather stored for later processing.

In Step 203, PoIs are retrieved from a PoI information repository based on at least one geo data item of the geo data items extracted from user network traffic flows. In one or more embodiments, any PoI within a range from each geo-location identified by each of the extracted one geo data item are retrieved from the PoI information repository. In one or more embodiments, each range from each geo-location is based on an uncertainty measure of a corresponding one of the extracted geo data item. For example, the uncertainty measure may be based on the digitization truncation error range when the physical longitude/latitude is converted to a numerical value. Generally, fine-grained location reports (i.e., geo data item with relatively small range) can uniquely identify a single PoI in the immediate proximity.

However, numerous reported locations cannot be mapped to such unique PoIs due to coarse-grained geo-location data (i.e., geo data items with relatively large range or imprecision as described in reference to FIG. 1B above) and/or a lack of any candidate PoIs in a targeted proximity (e.g., within the range of the geo data item). For example, network traffic logs from a large cellular operator identified that about 50% of geo data items are coarse-grained, having accuracy (e.g., used as range) of only one square kilometer. Therefore, while coarse-grained geo data items preserve user privacy, they effectively obfuscate true PoIs by increasing the number of candidate locations of interest, e.g., tens or hundreds locations.

In Step 204, a weighted count of the PoI is generated (e.g., tallied) for each of the geo data items. In one or more embodiments, the weighted count is weighted based on an attribute of a geo data item for which the weighted count is generated.

In one or more embodiments, the attribute represents context of the network flow from which the geo data item is extracted. In one or more embodiments, the context is determined based on a keyword that is co-present with the geo data item within a consecutive portion of the network traffic flow, where the consecutive portion has a length determined according to a keyword parsing rule. Specifically, the keyword is extracted from the network traffic flow according to the keyword parsing rule and then correlated to the PoI to generate a correlation measure. In particular, the attribute of the geo data item includes the correlation measure.

Context-based extraction of PoI identities is particularly effective for geo data items that correspond to user's network activity. Specifically, context of the reported location can be extracted from the textual description that accompanies the location's geo data item. Subsequently, employing such textual context, the actual PoI can be identified. For example, the following excerpt demonstrates joint presence of a location's geo coordinates and corresponding textual descriptions in the traffic of a weather application:

locationHistory="RECENTLOCATIONS: {{ } 39.6172-91.9283 ADDRESS {32122 Marilyn Road 589} {Monroe City} MO 63456 [{ } US { } { } 6]";

To convert such textual context to an actual PoI, the context (i.e., a text string of a pre-determined length that precedes or follows a geo data item) is extracted and checked to determine whether there exist any correlation between the context and any of the PoIs that can be found at or near the specific location. One possible approach tokenizes the extracted string to keywords, and queries a PoI information repository with the keywords as well as the reported geo coordinates. In the previous example, the geo-coordinates based query uses "39.6172-91.9283" as the search phrase, while the keywords based query uses any of the following strings as the search phrase: "locationHistory", "RECENTLOCATIONS", "32122", "32122 Marylin", "32122 Marylin Road", etc.

Once an overlap between the results of keywords-based and coordinates-based queries is found, the PoI related to the overlap is selected as the actual PoI. For example, suppose that the query with geo-coordinates (39.6172, −91.9283) returns "Joe's Haircuts", "Bob's Steak" and "Jeff's Shoes" as businesses existing at that location. Then, if a keyword query with "32122 Marylin Road" returns "Jeff's Shoes", then "Jeff's Shoes" is determined as the actual PoI corresponding to the geo data item.

In one or more embodiments, the attribute of a geo data item (for which the weighted count of a PoI is generated) represents a proximity measure of a PoI category with respect to other PoI categories in PoIs retrieved from the PoI information repository. To identify a PoI corresponding to a user's interest among a set of PoIs related to an area covered by a coarse-grained geo data item, historic knowledge of previously discovered/inferred PoIs is used. In one or more embodiments, proximity-based scoring to the categories (referred to as category scoring) of previously discovered/inferred PoIs is used in order to reconstruct general interests of the observed users. Examples of the PoI categories are "coffee houses" for PoIs such as Starbucks© or Pete's© Coffee, "football" for NFL© stadiums, etc.

In one or more embodiments, category scoring can be represented by any metric that cumulatively assigns higher scores to PoIs which are or were closer to the extracted geo data item. Consequently, whenever PoI is uniquely identified, it receives the highest score. In one or more embodiments, user interest vectors (also referred to as score vector, category score vector depending on the context) are used to organize scoring mathematically. The coordinates of a user interest vector for a given user are categories of any historically observed PoI candidates, and the values of coordinates are the scores accumulated for each PoI category over time.

For example based on historical observation, in a given area, an observed user was predominantly in a vicinity of restaurants surrounded by numerous bookstores and shops. Therefore, the user interest vector coordinates may be the names of these businesses (such as "Antonio's Pizza", "Books for Dimes", etc.) or the business categories, i.e., "restaurant", "bookstore" and "shop". Historical fine-grained geo data items indicated that the user was mainly entering restaurants in this area. Thus, having the highest scores, the current closest restaurant in this area is the most likely PoI for the user whenever geo data items are inconclusive.

In one or more embodiments, PoI categories are organized in a hierarchical tree and the proximity based category scoring also applies to higher-level hierarchical nodes. For example, the categories "gym" and "tennis court" are both subcategories of the category "sport facilities". When a user has several geo-location reports including PoIs in the "gym" category and then a geo-location report that includes a PoI in the "tennis court" category (in addition to other co-located PoIs), it can be inferred that the user is interested in the "tennis court" PoI due to "tennis court" being a subcategory of "sport facility" and the user previous visitation history including another subcategory ("gym").

As shown in the example depicted in FIG. 1B above, a PoI may be retrieved in relation to multiple geo data items. In Step 205, multiple weighted counts of a PoI are aggregated across all such multiple geo data item to generate a score or a category score of the PoI. In one or more embodiments where the PoI is associated with a hierarchy of categories, the score is generally referred to as a category score specific to the category in context. When the PoI in context is not categorized, i.e., with a single hierarchy level, the general term "category score" is referred to as simply score.

In Step 206, a determination is made as to whether category scores in a user interest vector (i.e., category score vector) of multiple PoIs or PoI categories are differentiated from each other. In one or more embodiments, the determination is made based on a category score differentiation measure. For example, the category score differentiation measure may be based on a ratio of the highest category score over the second highest category score in the category score vector. In other examples, different statistical measure may be used to measure whether category scores are different enough in the category score vector to indicate user interest in any particular PoI category of the category score vector. Returning to the discussion of Step 206, if the determination is positive (or "YES"), i.e., the category score differentiation factor meets a pre-determined requirement, the method proceeds to Step 208. Otherwise, if the determination is negative (or 'NO"), i.e., the category score differentiation factor does not meet a pre-determined requirement, the method proceeds to Step 207, where a geo data item extraction parameter and/or a PoI retrieval parameter is adjusted to improve the category score differentiation factor.

In one or more embodiments, retrieving the PoIs includes matching a time stamp of each geo data item to a pre-determined recurring time interval. In other words, any geo data item with a time stamp not matching the pre-determined recurring time interval is discarded and not used to retrieve any PoI. In such embodiments, the pre-determined recurring time interval is the PoI retrieval parameter that is adjusted to increase the category score differentiation measure of the category score vector. For example, the pre-determined recurring time interval may be adjusted as recurring on a daily basis, a weekly basis, a monthly basis, a quarter basis, or other recurring time period. In one or more embodiments, the duration and beginning of the pre-determined recurring interval is specific to the geo data item and can be specified based on frequency, reoccurrence, or other criteria.

In an example to include temporal dimension to PoI retrieval and scoring, interest vectors are generated that correspond to specific time intervals of a day (as well as the specific locations). For example, each day is divided into a series of intervals of a pre-determined duration (e.g., 30-minute intervals). Then, category score vectors are compared to each other for all time intervals (e.g., 11:00 pm to 11:30 pm, etc.) to identify a particular time interval where the corresponding category score vector has a satisfactory category score differentiation measure.

For example, the vector for this identified time interval (e.g., 11:00 pm to 11:30 pm) may be [10, 2, 1] for restaurant, shops, and gym. Consequently, with this additional information than the previous example, it can be inferred that the most likely PoI candidate is a restaurant at/near the geo data item identified location during 11:00 pm to 11:30 pm, while for the same geo-location coordinates the gym at/near the location becomes the most likely PoI between 6:00 pm and 6:30 pm, when the vector for that time interval is [2, 2, 5] for restaurant, shops, and gym.

In one or more embodiments, retrieving the PoIs includes assigning a PoI category to a group of PoIs that are grouped together base on a pre-determined similarity criterion. For example, two PoIs Starbucks© and Peet's Coffee© may be grouped into the PoI category "artisan cafe." In such embodiments, the score of all PoIs in the group are combined to generate a category score of the PoI category. In such embodiments, the hierarchical level of the PoI category is the PoI retrieval parameter that is adjusted to increase the category score differentiation measure of the category score vector. An example of adjusting the hierarchical level of the PoI category for retrieving PoIs to increase the category score differentiation measure of the category score vector is described in reference to FIG. 1A above.

In one or more embodiments, the PoI category ranking of the user is correlated with another PoI category ranking of another user to identify a co-located PoI category. In particular, the PoI category ranking and the another PoI category ranking are based on geo data items having respective same time stamps matching a particular time interval. In one or more embodiments, the PoI category ranking is adjusted based on the co-located PoI category. Examples of adjusting PoI category ranking based on the co-located PoI category to infer user interest are described below.

In some cases, geo data items of an individual user may not be sufficient to resolve the user's ambiguous PoI indications, irrespective of the number of the user's geo data item data attributes employed for the interest vector profiling. In one or more embodiments, the patterns of the user's collocation with other people at specific places/areas, at specific times of day, etc., are analyzed to create a collocation vector. Collocation vectors are used to infer the user PoIs based on activities of other people. The coordinates of a collocation vector are the "historically co-located" persons while values of the vector elements (i.e., coordinate values) represent collocation likelihood with such persons. For example, if we observe a user Bob and see that he repeatedly visits similar bars and restaurants with users Joe, John and Jeremy, than these three users become coordinates of Bob's collocation vector, and their coordinate values are proportional to the number of times they visited same venues as Bob.

In one or more embodiments, the interest vectors of the persons that are most likely to be collocated with the observed user are used to identify the ambiguous PoIs of the observed user. Specifically, the PoI with the highest scores for the majority of such collocated persons is selected. For example, Bob's interest vectors based on geo data item associated with at a given time of a day is not sufficient to determine whether Bob is at a local restaurant, gym or store. Therefore, Bob's collocation vector for the given area and time is checked to identify Joe, John and Jeremy as vector coordinates. Next, to infer Bob's PoI, Joe's, John's and Jeremy's interest-vector scores are evaluated for the given time and location. It is then determined that they score restaurants highest. Accordingly, Bob's corresponding PoI is identified as a restaurant. In another example, a user A is determined to be a friend with a user B based on one or more information sources, such as databases (e.g., white pages, city hall registry data, etc.), previous collocations, on-line social networks, other on-line information, such as on-line activity, e-mail exchanges, short message exchanges, voice calls, phone activity, etc. If the user A is reporting geo-coordinates at a location where there are near-by PoI X, PoI Y and PoI Z, while the user B and user C are reporting geo-coordinates of the same location, but are known to be in PoI X and PoI Y, respectively. Based on the information that the user A is known to be friend with the user B, it is concluded, with a high probability, that the user A is visiting PoI X.

In one or more embodiments, the score of the PoI is adjusted based on a profile of the user. When multiple PoIs are retrieved based on a single geo-location, whether reporting the user presence at that location or associated with a network activity about that specific location, known interest of the user identified based on a user profile is used to select the relevant PoI. The user profile may have been previously built by using geo-location information or through other sources, such as an on-line social network user public profile. In one or more embodiments, if only one of the PoIs at a given geo-location falls within known user interests based on the user profile, the user is assumed to be visiting that PoI. In one or more embodiments, if any PoI conflicting with a known user interest based on the user profile, the PoI is excluded from the set of relevant PoIs for the user.

In Step 208, when the score differentiation measure is satisfactory based on a pre-determined criterion, the interest level of the user is inferred based at least on the score of the PoI and/or the category of the PoI category as described above. For example, when the highest score is at least twice as high as the second highest score, the PoI or PoI category having the highest score is inferred as representing the user interest. In one or more embodiments, the score vector and/or category score vector are presented to an analyst user. In one or more embodiments, one or more PoI or PoI category with higher scores in the score vector and/or category score vector are presented to an analyst user. In one or more embodiments, a location based service is provided to the user based on the score vector, category score vector, or the one or more PoI or PoI category with higher scores in the score vector and/or category score vector. For example, if it is inferred based on the category score vector (e.g., the artisan coffee PoI category having highest score in the category score vector) that the user is interested in artisan coffee in a particular location and/or during a particular time interval, a customized promotion advertisement and/or promotion coupon may be delivered to this user.

Figure 3:
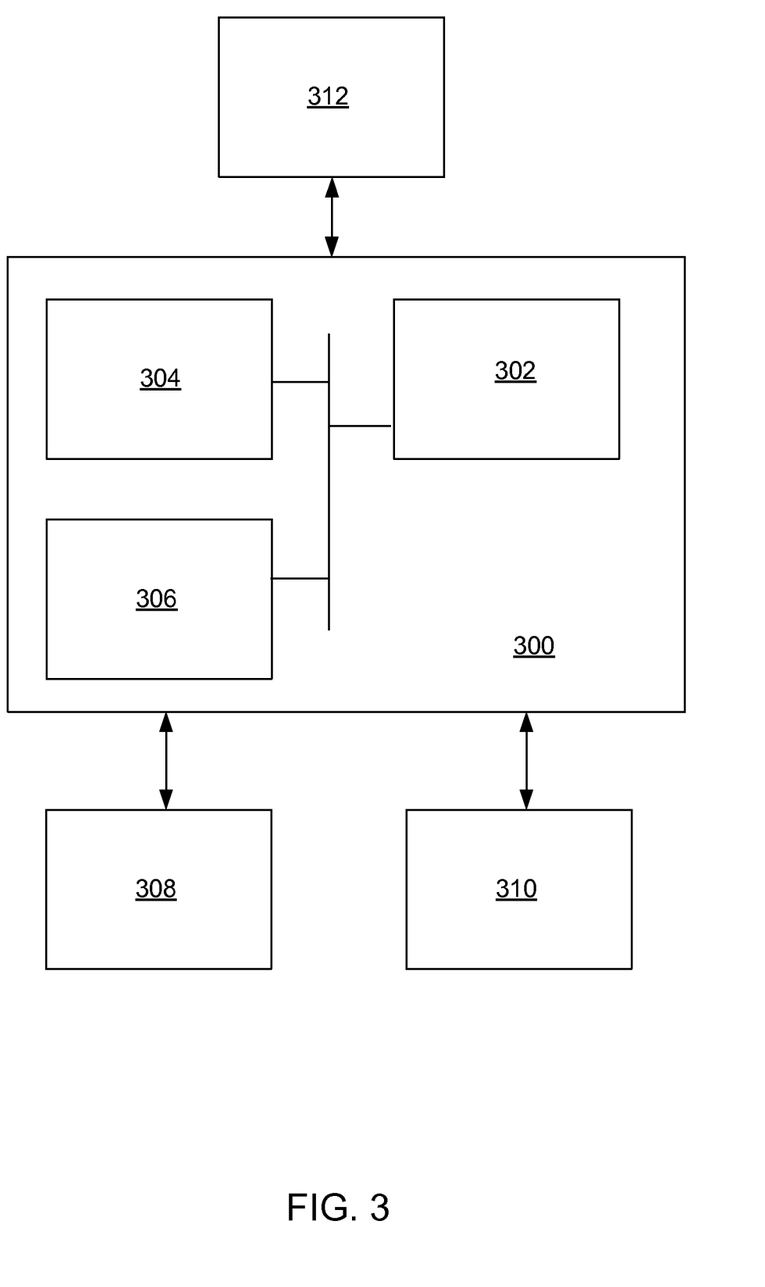
FIG. 3 shows a computer system according to aspects of the invention.

Embodiments of the invention may be implemented on virtually any type of computer regardless of the platform being used. For example, as shown in FIG. 3, a computer system (300) includes one or more processor(s) (302), associated memory (304) (e.g., random document access memory (RAM), cache memory, flash memory, etc.), a storage device (306) (e.g., a hard disk, an optical drive such as a compact disk drive or digital video disk (DVD) drive, a flash memory stick, etc.), and numerous other elements and functionalities typical of today's computers (not shown). The computer (300) may also include input means, such as a keyboard (308), a mouse (310), or a microphone (not shown). Further, the computer (300) may include output means, such as a monitor (312) (e.g., a liquid crystal display (LCD), a plasma display, or cathode ray tube (CRT) monitor) for example to display various results such as the feature vectors, the principal components, the application space, the signatures, etc. The computer system (300) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (300) includes at least the minimal processing, input, and/or output means necessary to practice embodiments of the invention.

Further, those skilled in the art will appreciate that one or more elements of the aforementioned computer system (300) may be located at a remote location and connected to the other elements over a network. Further, embodiments of the invention may be implemented on a distributed system having a plurality of nodes, where each portion of the invention (e.g., various modules of FIG. 1A) may be located on a different node within the distributed system. In one embodiments of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for inferring an interest level of a single user from a plurality of geo data items associated with the single user, comprising:
    extracting the plurality of geo data items from a plurality of network traffic flows associated with the single user, the plurality of network traffic flows including passive observations of Internet traffic, wherein each of the plurality of geo data items identifies a geo-location associated with the single user based on at least one geo-coordinate, wherein the extracted plurality of geo data items alone are insufficient for inferring user interests and not all geo data items in the extracted plurality of geo data items are determined to be relevant to the interests of the user, wherein determining whether a candidate geo data item is relevant to the interests of the user includes analyzing whether the candidate geo data item refers to a location of the user or to a location that is already deemed of interest to the user;

ignoring extracted geo data items not determined to be relevant to the interests of the user;

retrieving a plurality of point-of-interests (PoIs) from a PoI information repository based on extracted geo data items determined to be relevant to the interests of the user, wherein a PoI of the plurality of PoIs is retrieved based on at least one geo data item of the plurality of geo data items, wherein retrieving the PoIs includes using syntax of the single user's network activity in order to identify remote PoIs;

generating, by a computer processor and based on a pre-determined criterion, a weighted count of the PoI for each of the at least one geo data item associated with the single user, wherein each weighted count is weighted based on an attribute of a geo data item for which the weighted count is generated, wherein generating the weighted count includes analyzing the accuracy of each of the at least one geo data item associated with the single user, wherein the attribute of the geo data item comprises an uncertainty measure, a context, a category score vector, and a timestamp of the geo data item, the uncertainty measure being based on a digitization truncation error range when physical latitude/ longitude is converted to a numerical value, the context being determined based on a keyword that is co-present with the geo data item within a consecutive portion of a network traffic flow, the category score vector including coordinates derived from categories of historically observed PoI candidates, the timestamp being used to identify a particular time interval where the category score vector has a satisfactory category score differentiation measure, wherein values of the coordinates are scores accumulated for each PoI category over time, wherein categories are organized in a hierarchical tree, and wherein the satisfactory differentiation measure is based on a ratio of a highest category score over a second highest category score; and aggregating the weighted count across all of the at least one geo data item associated with the single user to generate a score of the PoI, wherein the score of the PoI is associated with the single user, wherein the interest level of the single user is inferred based at least on the score of the PoI.

2. The method of claim 1, wherein the PoI is within a range from each geo-location identified by each of the at least one geo data item.

3. The method of claim 2, wherein each range from each geo-location is based on an uncertainty measure of a corresponding one of the at least one geo data item.

4. The method of claim 1, wherein retrieving the plurality of PoIs comprises matching a time stamp of each of the plurality of geo data items to a pre-determined recurring time interval, and wherein the method further comprises adjusting the pre-determined recurring time interval to increase a score differentiation measure of the score among other scores of other PoIs in the plurality of PoIs.

5. The method of claim 1, further comprising:
obtaining a network traffic flow comprising the geo data item;
extracting, from the network traffic flow according to a pre-determined keyword parsing rule, a keyword that is co-present with the geo data item within a consecutive portion of the network traffic flow, wherein the consecutive portion has a length determined according to the pre-determined keyword parsing rule; and
correlating the keyword to the PoI to generate a correlation measure,
wherein the attribute of the geo data item comprises the correlation measure.

6. The method of claim 5, wherein the correlating comprises:
generating, using a pre-determined search engine, a search result based on the keyword; and
determining that the search result comprises information describing the PoI,
wherein the correlation measure is based at least on the determining.

7. The method of claim 1, further comprising:
extracting the geo data item from a network traffic flow associated with the single user; and
including the geo data item in the plurality of geo data items based on at least one selected from a group consisting of a persistency measure of the geo data item, a semantic analysis result of the network traffic flow, and a proximity measure of the geo data item with respect to a previously identified geo data item.

8. The method of claim 7, further comprising:
assigning a PoI category to a group of PoIs in the plurality of PoIs that are grouped together base on a pre-determined similarity criterion;
including the score of each PoI in the group of PoIs to generate a category score of the PoI category; and
generating, based on the category score of the PoI category, a PoI category ranking of the PoI category among a plurality of PoI categories in the plurality of PoIs, wherein the PoI category ranking is associated with the user,
wherein the interest level of the single user is further inferred based on the PoI category ranking.

9. The method of claim 8, further comprising:
determining, based on a pre-determined algorithm, a proximity measure of the PoI category with respect to other PoI categories in the plurality of PoIs,
wherein the PoI category ranking is further generated based on the proximity measure.

10. The method of claim 8,
wherein the PoI category ranking comprises a plurality of category scores assigned to the plurality of PoI categories,
wherein each of the plurality of category scores represents probability that prior physical locations of the single user were at a corresponding group of PoIs,
wherein the PoI category ranking is based on a hierarchical categorization of the plurality of PoIs in the plurality of PoIs, and
wherein the method further comprises adjusting the hierarchical categorization to increase a category score differentiation measure of the plurality of category scores.

11. The method of claim 10, further comprising:
correlating the PoI category ranking associated with the single user with another PoI category ranking associated with another single user to identify a co-located PoI category, wherein the PoI category ranking and the another PoI category ranking are associated with a same time stamp; and
adjusting the PoI category ranking based on the co-located PoI category,
wherein the co-located PoI category is assigned a category score in the PoI ranking and another category score in the another PoI ranking, and
wherein the category score and the another category score exceed a pre-determined threshold.

12. The method of claim 8,
wherein the PoI category ranking comprises a plurality of category scores assigned to a plurality of PoI categories,
wherein each of the plurality of category scores represents probability that prior physical locations of the single user were at a corresponding group of PoIs,
wherein retrieving the plurality of PoIs comprises matching a time stamp of each of the plurality of geo data items to a pre-determined recurring time interval, and
wherein the method further comprises adjusting the pre-determined recurring time interval to increase a category score differentiation measure of the plurality of category scores.

13. The method of claim 12,
wherein the pre-determined recurring time interval is recurring on at least one selected from a group consisting of a daily basis, a weekly basis, a monthly basis, and a quarter basis.

14. The method of claim 1, further comprising:
adjusting the score of the PoI based on a profile of the single user.

15. A system for inferring an interest level of a single user from a plurality of geo data items associated with the single user, comprising:
a PoI information repository storing a plurality of point-of-interests (PoIs);
a computer processor and memory storing instructions, when executed by the computer processor comprising functionality to;
extract the plurality of geo data items from a plurality of network traffic flows associated with the single user, the plurality of network traffic flows including passive observations of Internet traffic, wherein each of the plurality of geo data items identifies a geo-location associated with the single user based on at least one geo-coordinate, wherein the extracted plurality of geo data items alone are insufficient for inferring user interests and not all geo data items in the extracted plurality of geo data items are determined to be relevant to the interests of the user, wherein determining whether a candidate geo data item is relevant to the interests of the user includes analyzing whether the candidate geo data item refers to a location of the user or to a location that is already deemed of interest to the user;
ignore extracted geo data items not determined to be relevant to the interests of the user;
retrieve a plurality of point-of-interests (PoIs) from a PoI information repository based on extracted geo data items determined to be relevant to the interests of the user, wherein a PoI of the plurality of PoIs is retrieved based on at least one geo data item of the plurality of geo data items, wherein retrieving the PoIs includes using syntax of the single user's network activity in order to identify remote PoIs;
generate, based on a pre-determined criterion, a weighted count of the PoI for each of the at least one geo data item associated with the single user, wherein each weighted count is weighted based on an attribute of a geo data item for which the weighted count is generated, wherein generating the weighted count includes analyzing the accuracy of each of the at least one geo data item associated with the single user, wherein the attribute of the geo data item comprises an uncertainty measure, a context, a category score vector, and a timestamp of the geo data item, the uncertainty measure being based on a digitization truncation error range when physical latitude/longitude is converted to a numerical value, the context being determined based on a keyword that is co-present with the geo data item within a consecutive portion of a network traffic flow, the category score vector including coordinates derived from categories of historically observed PoI candidates, the timestamp being used to identify a particular time interval where the category score vector has a satisfactory category score differentiation measure, wherein values of the coordinates are scores accumulated for each PoI category over time, wherein categories are organized in a hierarchical tree, and wherein the satisfactory differentiation measure is based on a ratio of a highest category score over a second highest category score; and
aggregate the weighted count across all of the at least one geo data item associated with the single user to generate a score of the PoI, wherein the score of the PoI is associated with the single user,
wherein the interest level of the single user is inferred based at least on the score of the PoI; and
a repository storing the plurality of PoIs retrieved from the PoI information repository.

16. The system of claim 15, wherein the Pot is within a range from each geo-location identified by each of the at least one geo data item.

17. The system of claim 16, wherein each range from each geo-location is based on an uncertainty measure of a corresponding one of the at least one geo data item.

18. The system of claim 15,
wherein retrieving the plurality of PoIs comprises matching a time stamp of each of the plurality of geo data items to a pre-determined recurring time interval, and
wherein the instructions, when executed by the computer processor further comprising functionality to adjust the pre-determined recurring time interval to increase a score differentiation measure of the score among other scores of other PoIs in the plurality of PoIs.

19. The system of claim 15, wherein the instructions, when executed by the computer processor further comprising functionality to
obtain a network traffic flow comprising the geo data item;
extract, from the network traffic flow according to a pre-determined keyword parsing rule, a keyword that is co-present with the geo data item within a consecutive portion of the network traffic flow, wherein the consecutive portion has a length determined according to the pre-determined keyword parsing rule; and
correlate the keyword to the PoI to generate a correlation measure, wherein the attribute of the geo data item comprises the correlation measure.

20. The system of claim 19, wherein the correlating comprises:
generating, using a pre-determined search engine, a search result based on the keyword; and
determining that the search result comprises information describing the PoI,
wherein the correlation measure is based at least on the determining.

21. The system of claim 15, wherein the instructions, when executed by the computer processor further comprising functionality to:
extract the geo data item from a network traffic flow associated with the single user; and
include the geo data item in the plurality of geo data items based on at least one selected from a group consisting of a persistency measure of the geo data item, a semantic analysis result of the network traffic flow, and a proximity measure of the geo data item with respect to a previously identified geo data item.

22. The system of claim 15, wherein the instructions, when executed by the computer processor further comprising functionality to:
assign a PoI category to a group of PoIs in the plurality of PoIs that are grouped together base on a pre-determined similarity criterion;
include the score of each PoI in the group of PoIs to generate a category score of the PoI category; and
generate, based on the category score of the PoI category, a PoI category ranking of the PoI category among a plurality of PoI categories in the plurality of PoIs,
wherein the interest level of the single user is further inferred based on the PoI category ranking.

23. The system of claim 22, wherein the instructions, when executed by the computer processor further comprising functionality to:
determine, based on a pre-determined algorithm, a proximity measure of the PoI category with respect to other PoI categories in the plurality of PoIs,
wherein the PoI category ranking is further generated based on the proximity measure.

24. The system of claim 22,
wherein the PoI category ranking comprises a plurality of category scores assigned to the plurality of PoI categories,
wherein each of the plurality of category scores represents probability that prior physical locations of the single user were at a corresponding group of PoIs,
wherein the PoI category ranking is based on a hierarchical categorization of the plurality of PoIs in the plurality of PoIs, and
wherein the system further comprises adjusting the hierarchical categorization to increase a category score differentiation measure of the plurality of category scores.

25. The system of claim 22,
wherein the PoI category ranking comprises a plurality of category scores assigned to a plurality of PoI categories,
wherein each of the plurality of category scores represents probability that prior physical locations of the single user were at a corresponding group of PoIs,
wherein retrieving the plurality of PoIs comprises matching a time stamp of each of the plurality of geo data items to a pre-determined recurring time interval, and
wherein the system further comprises adjusting the pre-determined recurring time interval to increase a category score differentiation measure of the plurality of category scores.

26. The system of claim 25,
wherein the pre-determined recurring time interval is recurring on at least one selected from a group consisting of a daily basis, a weekly basis, a monthly basis, and a quarter basis.

27. The system of claim 22, wherein the instructions, when executed by the computer processor further comprising functionality to:
correlate the PoI category ranking associated with the single user with another PoI category ranking associated with another single user to identify a co-located PoI category, wherein the PoI category ranking and the another PoI category ranking are associated with a same time stamp; and
adjust the PoI category ranking based on the co-located PoI category,
wherein the co-located PoI category is assigned a category score in the PoI ranking and another category score in the another PoI ranking, and
wherein the category score and the another category score exceed a pre-determined threshold.

28. The system of claim 15, wherein the instructions, when executed by the computer processor further comprising functionality to:
adjust the score of the PoI based on a profile of the single user.

29. A non-transitory computer readable medium embodying instructions for inferring an interest level of a single user from a plurality of geo data items associated with the single user, the instructions when executed by a processor comprising functionality for:
extracting the plurality of geo data items from a plurality of network traffic flows associated with the single user, the plurality of network traffic flows including passive observations of Internet traffic, wherein each of the plurality of geo data items identifies a geo-location associated with the single user based on at least one geo-coordinate, wherein the extracted plurality of geo data items alone are insufficient for inferring user interests and not all geo data items in the extracted plurality of geo data items are determined to be relevant to the interests of the user, wherein determining whether a candidate geo data item is relevant to the interests of the user includes analyzing whether the candidate geo data item refers to a location of the user or to a location that is already deemed of interest to the user;
ignoring extracted geo data items not determined to be relevant to the interests of the user;
retrieving a plurality of point-of-interests (PoIs) from a PoI information repository based on extracted geo data items determined to be relevant to the interests of the user, wherein a PoI of the plurality of PoIs is retrieved based on at least one geo data item of the plurality of geo data items, wherein retrieving the PoIs includes using syntax of the single user's network activity in order to identify remote PoIs;
generating, based on a pre-determined criterion, a weighted count of the PoI for each of the at least one geo data item associated with the single user, wherein each weighted count is weighted based on an attribute of a geo data item for which the weighted count is generated, wherein generating the weighted count includes analyzing the accuracy of each of the at least one geo data item associated with the single user, wherein the attribute of the geo data item comprises an uncertainty measure, a context, a category score vector, and a timestamp of the geo data item, the uncertainty measure being based on a digitization truncation error range when physical latitude/longitude is converted to a numerical value, the context being determined based on a keyword that is co-present with the geo data item within a consecutive portion of a network traffic flow, the category score vector including coordinates derived from categories of historically observed PoI candidates, the timestamp being used to identify a particular time interval where the category score vector has a satisfactory category score differentiation measure, wherein values of the coordinates are scores accumulated for each PoI category over time, wherein categories are organized in a hierarchical tree, and wherein the satisfactory differentiation measure is based on a ratio of a highest category score over a second highest category score; and aggregating the weighted count across all of the at least one geo data item associated with the single user to generate a score of the PoI, wherein the score of the PoI is associated with the single user, wherein the interest level of the single user is inferred based at least on the score of the PoI.

\* \* \* \* \*